UNITED STATES PATENT OFFICE.

CARL THEODOR THORSSELL AND HARALD LUDVIG REINHOLD LUNDÉN, OF GOTTENBORG, SWEDEN.

PROCESS FOR THE PRODUCTION OF NITRATES BY MEANS OF BACTERIA.

1,288,754.    Specification of Letters Patent.    Patented Dec. 24, 1918.

No Drawing.    Application filed April 10, 1918.   Serial No. 227,793.

*To all whom it may concern:*

Be it known that we, CARL THEODOR THORSSELL, a citizen of Sweden, residing at Södra Hamngatan 11, Gottenborg, Sweden, and HARALD LUDVIG REINHOLD LUNDÉN, a citizen of Sweden, residing at Södra Hamngatan 11, Gottenborg, Sweden, have invented certain new and useful Improvements in Processes for the Production of Nitrates by Means of Bacteria, of which the following is a specification.

Processes hitherto known for the production of nitrates by means of bacteria require a very particular and careful and for that reason expensive observance of the process in many different places, and this is substantially due to the fact that the bacteria endure only diluted ammonium salt solutions. Moreover the processes require a very complicated apparatus. A great number of receptacles, lifting devices, piping, etc., is needed. On account of these circumstances it has proved a failure technically to make use of the knowledge that the bacteria have an oxidizing effect on ammonia in practical methods.

The object of the present invention is to overcome the difficulties arising in the technical application of the said process of nitrification by means of using only one single liquid of nutriment of always uniform composition for the oxidizing process. This is attained by from the beginning using a liquid of nutriment that contains such a quantity of the oxidation product desired besides the ingredients used for the oxidation that the solution after one single treatment in the oxidation apparatus without any further enrichment may be technically utilized.

If, for instance, a solution of calcium nitrate, to which a smaller quantity of an ammonium salt is added, is used as liquid of nutriment fresh calcium nitrate is formed on the presumption that the necessary quantity of calcium carbonate is added simultaneously. Then the concentrated solution of calcium nitrate may be further treated in a technical way. If for this purpose only a part is taken out from the running fabrication the necessary quantity of ammonium salt and water only needs to be added to the rest in order again to obtain the original composition of the liquid of nutriment so that the process of oxidation can be repeated again in the same way as the first time.

Experiments have shown that it is advantageous to use ammonium nitrate instead of the ammonium salts earlier used for the oxidation as the solution in this way can be protected against impurities and without any further purifying manufactured into salt or in a known way be used with other salts for chemical transformation. If ammonium nitrate is to be produced as final product a part of the solution of calcium nitrate is changed into ammonium nitrate and so great a quantity of the solution of ammonium nitrate formed is added to the rest of the solution of calcium nitrate that the liquid of nutriment obtains the original composition, while the rest of the solution of ammonium nitrate is manufactured into solid salt.

Instead of the ammonium salt a nitrogen combination, that can be oxidized to nitric acid, may be used as nutriment substance for the bacteria, for instance urinous substances or calcium cyanamid. This does not alter anything in the nature of the invention.

From what precedes it will be seen that the new process in chemical respect only requires one single supervision as it is only necessary to test the solution of nutriment for its content of ammonium. The necessary apparatus is also very simple, because the composition of the solution of nutriment is always the same and the composition of the solution of oxidation is almost uniform. Further there is no harm done when the action of the bacteria is interrupted as the solution of oxidation then still holds a part of the ammonium nitrate not decomposed, and only a smaller part of the ammonium salt obtained by the transformation must be added to the same.

The invention is illustrated by the following examples:

1. One cubic meter of solution of nutriment with 150 kilograms of calcium nitrate and 8 kilograms of ammonium sulfate are made subject to the action of bacteria. At complete oxidation a solution is obtained that contains 160 grams calcium nitrate per liter. 60 liters of this solution are used for any suitable purposes and to the rest, 940 liters, are added 60 liters of water and 8 kilograms of ammonium sulfate and a suitable amount of calcium carbonate. In this way a fresh solution of nutriment of the original composition is obtained anew.

2. One cubic meter of solution of nutriment with 150 kilograms of calcium nitrate and 10 kilograms of ammonia nitrate are made subject to the action of bacteria. At complete oxidation a solution is obtained that contains 170 grams of calcium nitrate per liter. 120 liters of this solution are set apart and transformed into ammonium nitrate. The solution obtained contains 166 grams of ammonium nitrate per liter. 60 liters of this solution, 60 liters of water, and 880 liters of the solution of oxidation form the fresh solution of nutriment which again, as required, contains 150 kilograms of calcium nitrate and 10 kilograms of ammonium nitrate. 60 liters of the solution of ammonium nitrate are used for evaporation of salt.

Having thus described our invention, what we claim as new and desire to secure by Letters Patent is:

1. The herein described process which consists in inoculating a liquid nutriment containing $CaCO_3$ calcium nitrate and ammonium sulfate with a nitrificating bacteria to effect oxidation whereby a resultant liquid is obtained containing calcium nitrate, separating the resultant liquid into portions, adding ammonium sulfate and calcium carbonate to one portion for producing a liquid nutriment identical with the original liquid nutriment, and inoculating the liquid nutriment thus obtained with the nitrificating bacteria.

2. The herein described process, which consists in inoculating a liquid nutriment containing $CaCO_3$ calcium nitrate and an ammonium salt with a nitrificating bacteria to effect oxidation whereby a resultant liquid is obtained containing calcium nitrate, separating the resultant liquid into portions, adding an ammonium salt and calcium carbonate to one portion for producing a liquid nutriment substantially identical with the original liquid nutriment, and inoculating the liquid nutriment thus obtained with the nitrificating bacteria.

3. The herein described process, which consists in inoculating a liquid nutriment containing $CaCO_3$ calcium nitrate and an ammonium salt with a nitrificating bacteria to effect oxidation whereby a resultant liquid is obtained containing calcium nitrate, separating the resultant liquid into portions, adding calcium carbonate and ammonium salt to one portion, and inoculating the resultant liquid mass with the nitrificating bacteria.

In testimony whereof, we have signed our names to this specification in the presence of two subscribing witnesses.

CARL THEODOR THORSSELL.
HARALD LUDVIG REINHOLD LUNDÉN.

Witnesses:
ROBERT T. TUNNERD,
SYLVESTER E. ROTHCHILDS.